United States Patent [19]

Liljedahl et al.

[11] 4,288,979
[45] Sep. 15, 1981

[54] COMBINED CYCLE POWER PLANT INCORPORATING COAL GASIFICATION

[75] Inventors: Gregory N. Liljedahl, Tariffville; Bruce K. Moffat, Simsbury, both of Conn.

[73] Assignee: Combustion Engineering, Inc., Windsor, Conn.

[21] Appl. No.: 77,708

[22] Filed: Sep. 21, 1979

[51] Int. Cl.³ .............................. F02C 3/28; F02C 6/18
[52] U.S. Cl. ................................ 60/39.12; 60/39.18 B
[58] Field of Search ........................ 60/39.12, 39.18 B

[56] References Cited

U.S. PATENT DOCUMENTS

| 3,002,347 | 10/1961 | Sprague | 60/39.18 B |
| 3,150,487 | 9/1964 | Mangan et al. | 60/39.18 B |
| 4,099,374 | 7/1928 | Foster-Pegg | 60/39.12 |
| 4,212,160 | 7/1980 | Blaskowski | 60/39.12 |

Primary Examiner—Louis J. Casaregola
Attorney, Agent, or Firm—Robert L. Olson

[57] ABSTRACT

A combined cycle power plant incorporating a coal gasifier as the energy source. The gases leaving the coal gasifier pass through a liquid couplant heat exchanger before being used to drive a gas turbine. The exhaust gases of the gas turbine are used to generate both high pressure and low pressure steam for driving a steam turbine, before being exhausted to the atmosphere.

3 Claims, 1 Drawing Figure

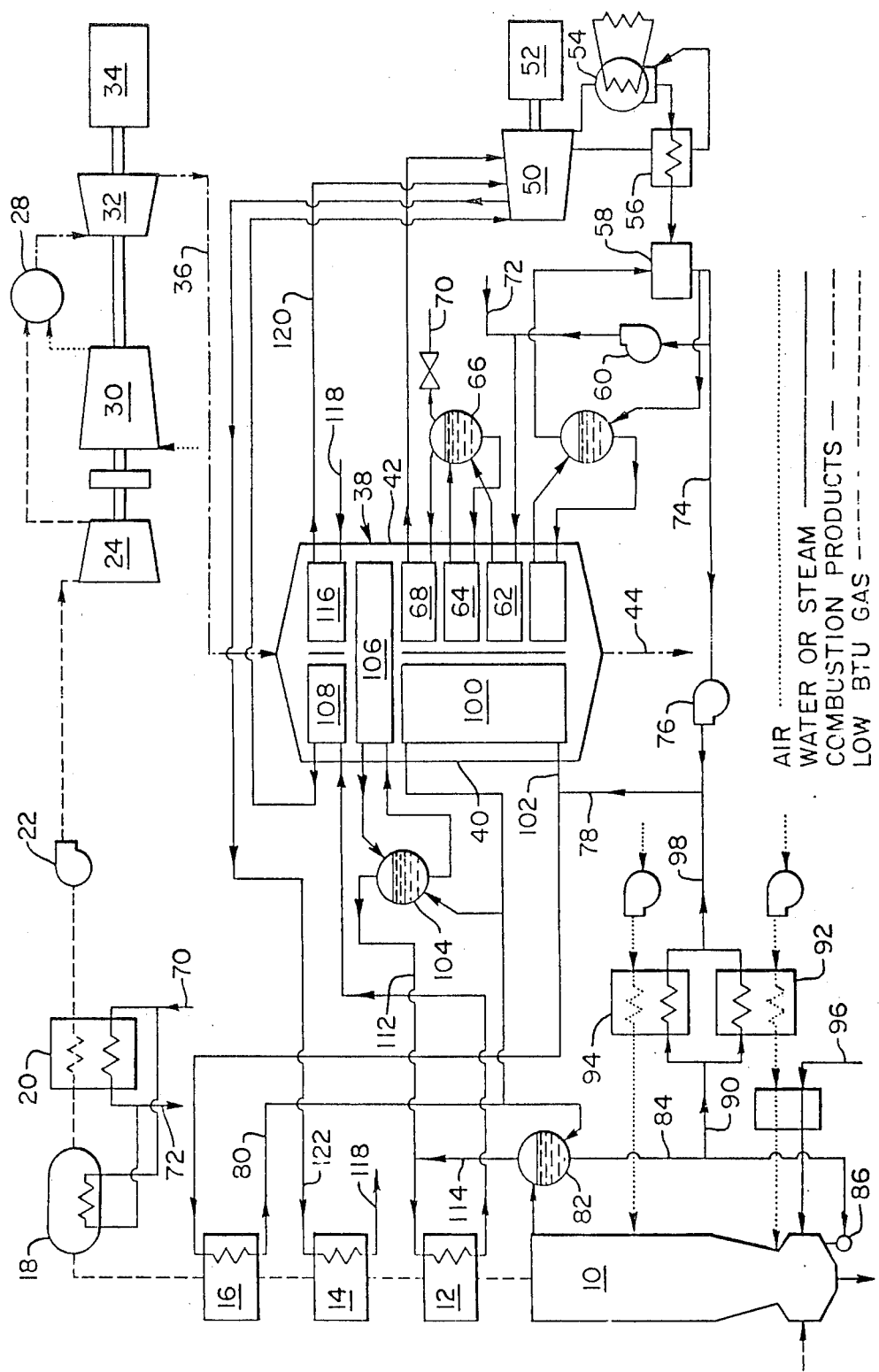

COMBINED CYCLE POWER PLANT INCORPORATING COAL GASIFICATION

BACKGROUND OF THE INVENTION

One means of using coal in a relatively pollution-free manner to generate power is to burn the coal in a gasifier, producing a low BTU gas which can be used in a combined cycle, or a gas turbine and a steam generator, both of which drive electrical generators. In order to maximize efficiency of a combined cycle, it is necessary to utilize as much of the heat at the highest thermal level in the flue gases leaving the gasifier, steam generator, and the gas turbine as possible.

SUMMARY OF THE INVENTION

In accordance with the invention, a combined cycle power plant is provided having a coal gasifier as the energy course. The gases leaving the coal gasifier pass through a liquid couplant heat exchanger before being used to drive a gas turbine. The exhaust gases of the gas turbine are used to generate both high pressure and low pressure steam for driving a steam turbine, before being exhausted to the atmosphere.

BRIEF DESCRIPTION OF THE DRAWING

The drawing is a schematic of a combined cycle incorporating the liquid couplant heat exchanger of the invention.

DESCRIPTION OF THE PREFERRED EMBODIMENT

Looking now to the drawing, numeral 10 designates a coal gasifier producing a low BTU gaseous fuel. In the gasifier, pulverized coal and air are reacted, at a high temperature, to form a fuel gas containing primarily carbon monoxide and hydrogen as combustibles, having a BTU value of 100-125 BTU cubic feet. The gas produced in the gasifier passes through a low temperature superheater 12, a low temperature reheater 14, and a liquid couplant heat exchanger 16, before being cleaned of particulate matter in the gas cleanup complex 18. The gas leaves the gasifier at approximately 1700° F. and after giving up heat in the heat exchangers, it enters the gas cleanup complex 18 at 300° F.

In addition to removal of solids, the complex 18 removes sulphur compounds, such as hydrogen sulphide, by means of any of several well-known processes such as solvent absorption, or a dry absorption process. The low BTU gas leaving the cleanup complex passes through a booster fan inlet heater 20, and a booster fan 22 before entering a fuel compressor 24, at approximately 150° F. and 15 psia. The compressed gas flows to combustor 28 at 775° F. and 260 psia.

Air is also supplied to combustor 28 by compressor 30, to support combustion of the gas. The hot gases pass through a gas turbine 32, which drives an electric generator 34. The turbine also drives the fuel and air compressors.

The exhaust from the gas turbine at approximately 1085° F. and 15 psia, flows through duct 36 to a heat recovery steam generator 38. The gases flow through two parallel passes 40 and 42 in the boiler 38, before being exhausted to the atmosphere through duct 44.

The liquid and steam circuits will now be explained. Steam from the generator passes through steam turbine 50, which drives the electrical generator 52. The steam then is condensed in condensor 54 and flows to the feedwater heater 56 and deaerator 58. Part of the flow then passes through the low pressure boiler feed pump 60, onto the low pressure boiler system contained in the right-hand pass 42 of the steam generator 38. The fluid passes through economizer 62, evaporator 64, and into drum 66. The low pressure steam from drum 66 flows through superheater 68, and then goes to the low-pressure stage of the turbine 50. Part of the steam from drum 66 flows through line 70 to the booster fan inlet heater 20, for heating the low BTU gas coming from the gas cleanup complex 18. The fluid then returns through line 72 to the economizer 62.

Another portion of the fluid from the dearator 58 passes through line 74, a high pressure boiler feed pump 76 and line 78 to the liquid couplant heat exchanger 16. The heated fluid from 16 flows through line 80 to drum 82. This drum feeds evaporator surface (not shown) in the gasifier 10 through line 84 and header 86. Steam flows from drum 82 through line 114 to the low temperature superheater 12.

Hot water also flows from drum 82 through lines 84 and 90 to the primary air heater 92 and secondary air heater 94, to heat the air used for combustion of the coal in the gasifier 10. Line 96 introduces coal to the gasifier 10. The heating fluid discharged from the air heaters flows back to the heat exchanger 16 through lines 98 and 78.

Looking again to the heat recovery steam generator 38, water is supplied to a high pressure economizer 100 through line 102 from the deaertor 58. Part of this discharges into drum 104, with the water therefrom flowing to and through the evaporator 106, which extends across both of the gas passes 40, 42. The steam and water mixture then returns to drum 104 with the steam flowing onto superheaters 12 and 108, and then to the turbine 50. Steam is supplied to 12 from drum 104 through line 112 and also from the gasifier drum 82 through line 114.

In the right-hand gas pass 42 of the waste heat boiler 38, a reheater 116 receives steam from the low temperature reheater 14 through line 118, and discharges it through line 120 to the intermediate state of turbine 50. Reheater 14 receives steam from the discharge of the first stage of turbine 50 through line 122.

The steam from superheater 108 flows through turbine 50 at 1000° F. and 2535 psia. and the steam leaves reheater 118 at 1000° F. and 450+psia. This is very good, considering the gas entering the heat recovery steam generator is at 1085° F. and 15+psia. This is made possible because of the efficient usage of the available heat in the system, particularly the liquid couplant heat exchanger 16, the heat exchange surface in gasifier 10, and the low temperature boiler, part of the steam from which is used to heat the low BTU gas in heater 20.

What is claimed is:

1. A power generating plant comprising a coal gasifier in which gaseous fuel is generated, an air heater which supplies heated air to the gasifier, a gas cleanup complex downstream of the gasifier, a booster fan downstream of the gas cleanup complex, a booster fan inlet heater upstream of the booster fan, a fuel gas compressor downstream of the booster fan, a gas turbine fired by said gaseous fuel, a heat recovery steam generator heated by the exhaust gases from the gas turbine, the heat recovery steam generator having two parallel gas passes through which the exhaust gases flow, one of the gas passes containing a high pressure steam generator, a steam turbine having high pressure, intermediate pressure, and low pressure steam stages, the high pressure steam generator supplying steam to the high pressure stage of the steam turbine, the other gas pass containing a high pressure reheater and a low pressure steam generator, the reheater supplying steam to the intermediate pressure stage of the steam turbine, and the low pressure steam generator supplying steam to the booster fan inlet heater, and also to the low pressure stage of the steam turbine.

2. The power generating plant of claim 1, including a steam generator in the gasifier, a heat exchanger intermediate the gasifier and the gas cleanup complex, which supplies fluid to the gasifier air heater, and to the inlet of the steam generator in the gasifier.

3. The power generating plant of claim 2, including a low temperature reheater and a low temperature superheater heated by the gaseous fuel leaving the gasifier, with the steam therefrom flowing to the heat recovery steam generator reheater and superheater respectively.

* * * * *